United States Patent [19]

Marianu

[11] Patent Number: 4,511,019
[45] Date of Patent: Apr. 16, 1985

[54] SPOT-TYPE DISC BRAKE, IN PARTICULAR FOR AUTOMOTIVE VEHICLES

[75] Inventor: Vlad Marianu, Frankfurt-Griesheim, Fed. Rep. of Germany

[73] Assignee: ITT Industries, Inc., New York, N.Y.

[21] Appl. No.: 446,849

[22] Filed: Dec. 6, 1982

[30] Foreign Application Priority Data

Mar. 15, 1982 [DE] Fed. Rep. of Germany ....... 3209389

[51] Int. Cl.³ .................. F16D 55/224; F16D 65/00
[52] U.S. Cl. ............................. 188/72.2; 188/73.35; 188/73.45
[58] Field of Search ............... 188/73.42, 73.41, 73.44, 188/73.45, 73.43, 73.39, 73.35, 73.36, 73.37, 73.38, 205 A, 206, 72.2, 70 B, 70 R, 72.9, 140 A, 250, 136, 370, 135, 73.31, 73.33

[56] References Cited

U.S. PATENT DOCUMENTS 4,305,483  12/1981  Ikeda ................................. 188/73.39
4,333,550  6/1982  Shirai ................................ 188/72.2

FOREIGN PATENT DOCUMENTS 2804977  8/1979  Fed. Rep. of Germany ... 188/73.45
2096257  10/1982  United Kingdom ............... 188/72.2

*Primary Examiner*—Douglas C. Butler
*Attorney, Agent, or Firm*—James B. Raden; Edward J. Brosius

[57] ABSTRACT

In a spot-type disc brake, the brake caliper which embraces the edge of a brake disc as well as brake shoes supported on both sides of the brake disc and which contains an actuating device is connected to the brake support member positively by a first guide pin received in a bore of the brake support member and slidably in the direction of the axis of rotation of the brake disc. The brake caliper is movable relative to the brake support member in a circumferential direction of the brake disc while, however, there is ensured at the same time a stable alignment of the brake caliper relative to the brake disc, in that a second guide pin which is supported in a bore provided in the brake caliper is arranged in parallel to the first guide pin. The two guide pins are rigidly connected to one another by a lever. At a point remote from the guide pins, the brake caliper is retained in abutment on a tangential sliding surface by springs. The second guide pin can, however, also extend normal to and be rigidly connected to the first pin, and be received in a correspondingly oriented bore of the caliper.

9 Claims, 6 Drawing Figures

SPOT-TYPE DISC BRAKE, IN PARTICULAR FOR AUTOMOTIVE VEHICLES

BACKGROUND OF THE INVENTION

The present invention relates to a spot-type disc brake in general, and more particularly to a disc brake for automotive vehicles.

It is customary to provide a disc brake of this type with a brake caliper which embraces the periphery of a brake disc as well as with brake shoes that are supported on a brake support member on both sides of the brake disc. The caliper usually carries a brakeactuating device. In many disc brake constructions, the brake caliper is positively connected to the brake support member by means of a guide element that is in sliding engagement with a portion of the brake support member to permit the caliper to move in the direction of the axis of rotation of the brake disc.

In a known spot-type disc brake of the above type, which is disclosed in German printed and published patent application No. 28 36 589, the brake caliper is rigidly coupled to the guide element and the latter is slidably supported on the disc entry side in a bore of the brake support member. This provides for an exact alignment of the brake caliper relative to the brake disc. A second guide element is slidably supported at the disc exit side in a bore of the brake support member in parallel to the first-mentioned guide element. The second guide element has at its fastening end a transverse bore lined with elastic material. A pin of the brake caliper extending in a circumferential direction of the brake disc engages in this transverse bore. Due to this design, transverse forces in the caliper guidance are avoided to a large degree in the known spot-type disc brake when the brake support member deforms under load. However, the movement of the brake shoes in the direction of rotation of the brake disc during braking leads to a considerable clamping of the first guide element in its supporting bore and thereby impairs ease of slidability of the brake caliper in relation to the brake support member. As a result, the first guide element is subject to increased wear. In addition, there occur movements due to deformation at the brake caliper as a result of this arrangement which cause wedge-shaped wear of the brake shoes, as viewed in the circumferential direction of the brake disc.

SUMMARY OF THE INVENTION

Accordingly, it is a general object of the present invention to avoid the disadvantages of the prior art.

More particularly, it is an object of the present invention to provide a spot-type disc brake which does not possess the disadvantages of the conventional disc brakes of this type.

Still another object of the present invention is so to construct the disc brake of the type here under consideration that the caliper is able to follow or share in the movement of the brake shoes in the circumferential direction of the brake disc.

It is yet another object of the invention to so design the disc brake of the above type that the capability of the caliper to move parallel to the axial direction of the brake disc is not impaired by forces acting transversely of the guiding arrangement that guides the caliper on the brake support member for such movement.

An additional object of the present invention is to develop an arrangement for mounting the caliper on the support member for the above-mentioned movement in such a manner as to prevent the caliper from turning relative to the support member about an axis extending radially of the brake disc.

A concomitant object of the present invention is to devise a mounting arrangement of the type here under consideration which is simple in construction, inexpensive to manufacture, easy to install, and reliable in operation nevertheless.

It is a further object of the present invention to so design the mounting arrangement as to obtain simple manipulation during the brake shoe replacement procedure.

In pursuance of these objects and others which will become apparent hereafter, one feature of the present invention resides in a spot-type disc brake for use in conjunction with a brake disc mounted on a support for rotation at least in one direction about an axis, which comprises a support member stationarily mounted on the support; first and second brake shoes respectively mounted on the support member at one and the other axial side of the brake disc for movement toward and away from the brake disc; and means for moving the brake shoes at least toward the brake disc, including a caliper member, means for so mounting the caliper member on the support member for movement relative thereto that the caliper member extends past the brake disc and the brake shoes, including a first guide element mounted on one of the members, especially on the support member, for movement relative thereto substantially parallel to the axis of the brake disc, and a second guide element so mounted on the other of the members, especially on the caliper member, and so rigidly connected to the first guide element as to permit the caliper member to conduct movement relative to the support member substantially in and opposite to the one direction while preventing the caliper member from turning relative to the support member about an axis extending radially of the brake disc, and an actuating unit mounted on the caliper member at the one axial side and acting on the first brake shoe directly and on the second brake shoe indirectly through the caliper member.

In this manner, there is provided a floating-caliper spot-type disc brake in which the brake caliper contributes to stabilization of the alignment of the brake shoes in parallel to the brake disc so that there occurs no wedgeshaped wear of the brake shoes when viewed in the circumferential direction of the brake disc. The load on the guidance of the brake caliper during braking is low, since the brake caliper is able to follow the movements of the brake shoes. Owing to this, the spot-type disc brake is according to the present invention particularly suited for use with brake shoe supports having a servo effect, wherein the brake shoes are supported on devices which are movable within limits and which provide for the brake shoes to be additionally pressed against the brake disc by utilizing the supporting force to achieve this effect.

In a known spot-type disc brake having a hydraulic support of the brake shoes to achieve a servo effect as disclosed in the British Pat. No. 1 201 330, elastic rubber elements are secured between the brake caliper and the brake support member. These elastic elements form a brake caliper guidance that is movable in the direction of rotation of the brake disc and in the direction of the brake disc axis. However, the elastic deformability of the rubber elements of this known disc brake is not limited to these two directions of movement; rather, it permits the brake caliper to move in all directions. For this reason, stable alignment of the position of the brake caliper relative to the brake disc is absent from this construction, so that, in the event of uneven friction forces acting on either one of the brake shoes, wedge-shaped wear of the respective brake shoe may occur either in the direction of rotation or in a radial direction in respect of the brake disc, or in both of these directions. The brake caliper of this known brake is also insufficiently secured in position against movement outward radially by the rubber elements.

In accordance with an advantageous facet of the present invention, the brake caliper is urged by a spring against a stop on the brake support member in a direction opposite to the main direction of rotation of the brake disc. In this manner, the brake caliper obtains a defined inactive position, and the necessary clearance between the brake caliper and brake support member is established after each braking action on the disc exit side as viewed in the main direction of rotation of the brake disc.

In an embodiment of the invention which is currently preferred because of its ease of manufacturability, the guide elements are constituted by pins which are slidably supported in bores in the brake caliper and of the brake support member, respectively. Advantageously, the guide pins are spaced differently from the axis of rotation of the brake disc in this arrangement, are rotatably supported in the bores provided in the brake caliper and in the brake support member, respectively, and are rigidly interconnected by a lever. This construction according to the present invention has the advantage that high guiding forces can be received under advantageous sliding conditions. To this end, it will be expedient to have the pins arranged on opposite sides of the lever, as the position of the pins can be easily conformed in this manner to the structural conditions of a spot-type disc brake. A brake of low weight and requiring small mounting space is obtained as a result of this construction. A simplification of the disc brake of the present invention can furthermore be obtained in that the lever forms the stop for the brake caliper.

In accordance with another advantageous concept of the present invention, the bore receiving the pin that forms the first guide element is contained in an arm of the brake support member straddling the brake disc. In this arrangement, the arm is preferably located in front of the brake caliper as considered in the main direction of rotation of the brake disc. This improvement of the invention renders it possible to transmit the forces to be received by the caliper guidance onto the brake support member in the vicinity of the brake disc, as a result of which the axial dimension of the brake support member is kept small.

To prevent the brake caliper from turning about an axis formed by the guide elements and parallel to the disc axis, according to still another proposal of the present invention there is provided a sliding guide for the brake caliper at the brake support member spaced from the first and the second guide element as viewed in the direction of rotation of the brake disc. This sliding guide may expediently consist of additional first and second guide elements which are arranged symmetrically to the initially mentioned first and second guide elements. In a simplified version of the inventive spot-type disc brake, the brake caliper can movably abut at its disc entry end as considered in the main direction of rotation of the brake disc on a sliding surface stationary with respect to the brake support member, this sliding surface being aligned tangentially to the brake disc, and there can be provided resilient means which urges the brake caliper against the sliding surface. To reliably avoid movement of the brake caliper in the direction toward the wheel rim, it is advantageous when the sliding surface is formed on a supporting element that embraces the end of the brake caliper radially from the outside. The end of the brake caliper of the spot-type disc brake of the present invention can include a detachable guide pin which is parallel to the axis of the brake disc and engages from underneath the supporting element. This ensures a simple detachable securing-in-position for the brake caliper, which provides for ease of replacement of the brake shoes.

In accordance with another aspect of the present invention, the supporting element is formed by a component separate from the brake support member and rigidly connected thereto and has abutment surfaces on which the brake shoes are supported. This renders it possible to use a component in the area of the brake shoe support, the material of which is different from the material of the brake support member and which offers advantageous surface conditions and properties for the abutment surfaces of the brake shoes. A currently preferred improvement of the spot-type disc brake of the present invention will be obtained in that the brake shoes comprise a braking-force bell crank lever at their disc entry end as considered in the main direction of rotation of the brake disc, through which lever the brake shoes bear against the brake support member. With the aid of the braking-force bell crank levers, the brake shoes are additionally pressed against the brake disc, whereby a quantatively regulated servo effect will be attained. The inventive guidance of the brake caliper avoids impairment of the servo effect due to friction forces between the brake caliper and the brake shoes.

A particularly advantageous course of movement of the brake caliper in the direction of rotation of the brake disc will be achieved by an arrangement of axially parallel guide pins such that a connecting plane interconnecting the central axes of the two guide pins extends generally radially to the axis of rotation of the brake disc. It will be particularly advantageous in this arrangement when the radially outward guide pin engages a bore of the brake support member and the radially inward guide pin is received in a bore of the brake caliper. This results in a particularly advantageous path of motion for the radially inward guide pin, especially when the radially inward guide pin is arranged in the main direction of rotation of the brake disc at such a distance frontwardly of a radial plane of the brake disc extending through the axis of the radially outward guide pin that the connecting plane forms an angle of 10° to 20° with the radial plane.

Preferably, the brake caliper comprises an arm which extends radially from the housing of the brake cylinder in a circumferential direction to the brake disc and whose end contains a supporting sleeve having a bore to receive the respective guide pin. This design aids in accommodating the brake in the mounting space available. To retain the brake caliper resiliently on a stop of the brake support member, there is preferably provided a spring which embraces the supporting sleeve of the brake caliper and has one end portion which bears against the lever interconnecting the guide pins and another end portion bearing against the arm of the brake caliper carrying the supporting sleeve. This spring is secured in its mounting position in a simple manner, especially when the guide pin that engages the supporting sleeve is hindered from displacement by a lock ring engaging registering grooves in the supporting sleeve and in the guide pin.

Furthermore, an advantageous improvement of the present invention is obtained when the two guide pins are oriented at right angles to one another and directly rigidly interconnected with each other at one of their ends, one of the guide pins being supported for rotation and axially sliding in a bore of the brake support member and the other guide pin being received in a bore of the brake caliper. This embodiment of the invention has a simple design, but it still requires an additional support of the brake caliper at the brake support member at a place radially remote from the guide pin engaging the brake caliper in order to prevent turning of the brake caliper about the support that is formed by the guide pin.

An advantageous embodiment of this invention can also include a guide arrangement in the form of a sliding block inserted between the brake caliper and the brake support member, the sliding block being slidable due to groove and tongue guidances in a first direction of motion relative to the brake support member and in a second direction of motion relative to the brake caliper, these two directions of motion extending normal relative to one another. Preferably, the sliding block is composed of a material insusceptible to corrosion and having advantageous sliding properties.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENT

Figure 1:
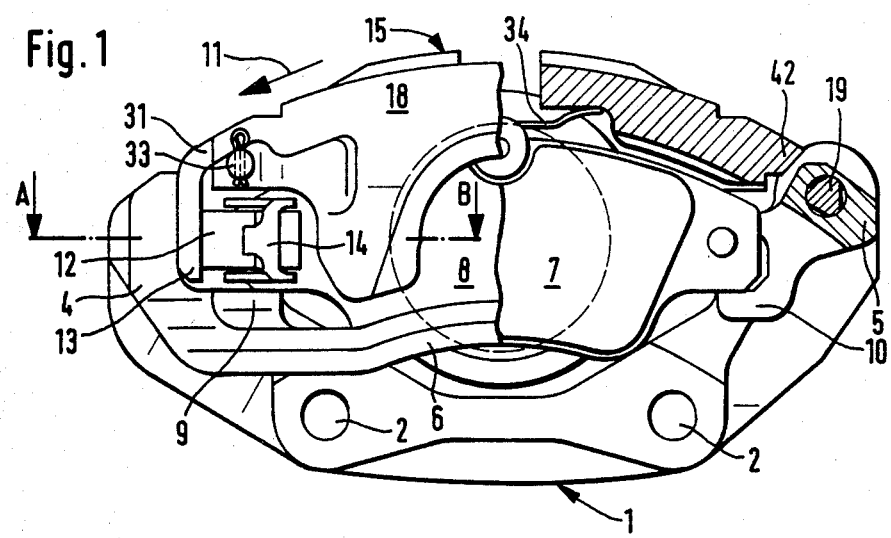
FIG. 1 is a partially sectional front elevational view of a spot-type disc brake of the present invention equipped with parallel guide pins.
Figure 2:
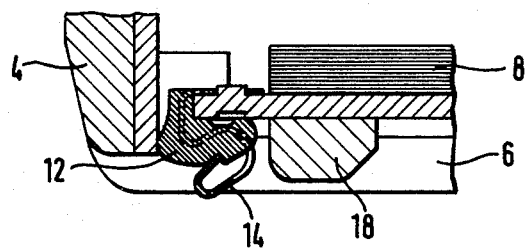
FIG. 2 is a cross-sectional top plan view of a fragment of the brake according to FIG. 1 taken along the line AB in FIG. 1.

Referring now to the drawing in detail, it may be seen that it depicts a spot-type disc brake which is currently intended for use on passenger cars and similar vehicles. As shown particularly in FIG. 1, the brake comprises a brake support member 1 which is provided with fastening holes 2. The holes 2 serve to receive screws or similar fastening elements that connect the brake support member 1 to a steering knuckle, the axle or any other component of the wheel suspension of the respective vehicle laterally of a brake disc 3. The brake support member 1 has two arms 4 and 5 which straddle the outer periphery of the brake disc 3. The free ends of the arms 4 and 5 are interconnected by a web 6. Interposed between the arms 4 and 5 on the respective axial sides of the brake disc 3 are brake shoes 7 and 8 each consisting of a friction lining and a carrier plate. The brake shoes 7 and 8 have respective ends having surfaces that face radially inwardly in relation to the brake disc 3. These surfaces abut associated surfaces provided on projections 9 and 10 of the arms 4 and 5, and extending in the brake disc secant direction. At their end facing in a main direction 11 of rotation of the brake disc 3, which corresponds to the forward driving direction of the vehicle, the brake shoes 7 and 8 bear via braking-force bell crank levers 12 against a supporting element 13 which is riveted to the arm 4. As shown in FIG. 2, the braking-force bell crank levers 12 are retained on the brake shoes 7 and 8, when the brake is released and the respective lever 12 is in its inactive position illustrated in FIG. 2, by S-shaped leaf springs 14 that embrace the braking-force bell crank levers 12 and have frame-like configurations. At their other ends facing in the direction opposite to the main direction 11 of rotation of the brake disc 3, the brake shoes 7 and 8 are directly supported on the arm 5 of the brake support member 1, in a manner shown in FIG. 1.

Figure 3:
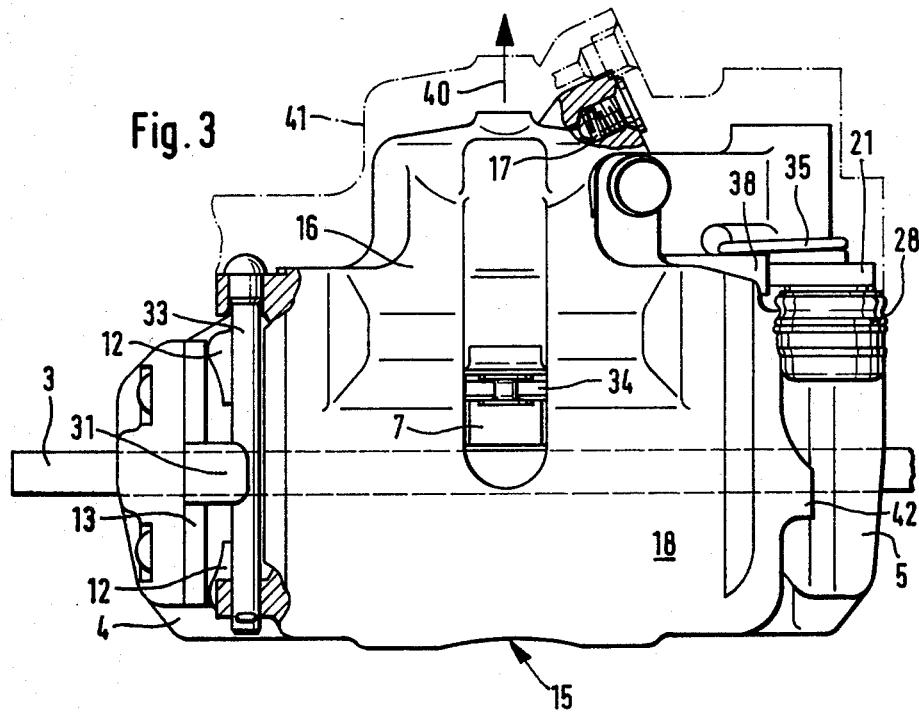
FIG. 3 is a top plan view of the brake according to FIG. 1.

The brake further includes a brake caliper 15 that is also arranged between the arms 4 and 5 and radially outwardly embraces the brake shoes 7 and 8 and the brake disc 3. As illustrated especially in FIG. 3, the brake caliper 15 has a leg 16 forming a brake cylinder that contains a piston acting upon the brake shoe 7. To hydraulically actuate the piston, pressurized braking fluid is supplied through a connecting bore 17 to the brake cylinder. The brake caliper 15 further includes another leg 18 which is juxtaposed with a back side of the brake shoe 8. Upon application of the brake, the brake caliper 15 is axially displaced and transmits the actuating force to the brake shoe 8, in that its leg 18 abuts the back side of the brake shoe 8.

Figure 5:
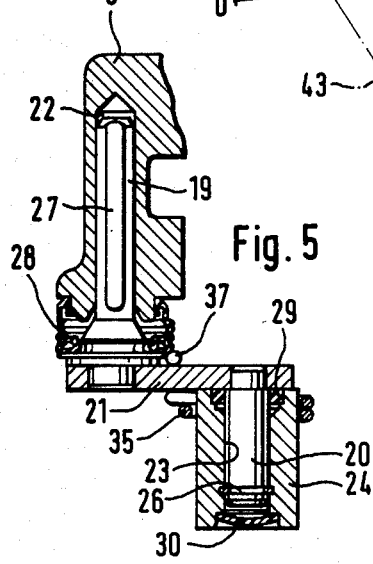
FIG. 5 is a sectional view of a brake fragment taken along the line CD at FIG. 4.

To be able to follow the movement of the brake shoe 8 in the axial direction of the brake disk 3 and the movement of both brake shoes 7 and 8 in the direction 11 of rotation of the brake disc 3 in each case upon application of the brake, the brake caliper 15 is guided on the arms 4 and 5 of the brake support member 1 for movement in and opposite to such directions. As particularly shown in FIG. 5, the guidance at the arm 5 comprises two guide pins 19 and 20 with parallel axes. The pins 20 and 21 are rigidly interconnected by a lever 21. The guide pins 19 and 20 are arranged on opposite axial sides of the lever 21. The guide pin 19 is supported for rotation and for longitudinal sliding movement in a bore 22 provided in the arm 5. The guide pin 20 is rotatably supported in a bore 23 in a supporting sleeve 24 which is formed at the free end of a supporting arm 25 connected to the caliper leg 16. A lock ring 26 which is received in associated grooves in the guide pin 20 and in the sleeve 24 provides for axial fixation of the pin 20 in the bore 23.

To reduce sliding friction, the gap between the guide pins 19, 20 and the bores 22 and 23 is filled with a lubricant. In addition, the pin 19 has flattened portions 27, so that compartments for the lubricant are formed in the bore 22. The open end of the bore 22 is closed by a pleated bellows 28 which sealingly surrounds the projecting portion of the guide pin 19 and an annular collar provided on the arm 5. To seal the bore 23, a sealing ring 29 is inserted between the supporting sleeve 24 and the lever 21. The end of the bore 23 which is remote from the lever 21 is closed by a cap 30.

Figure 4:
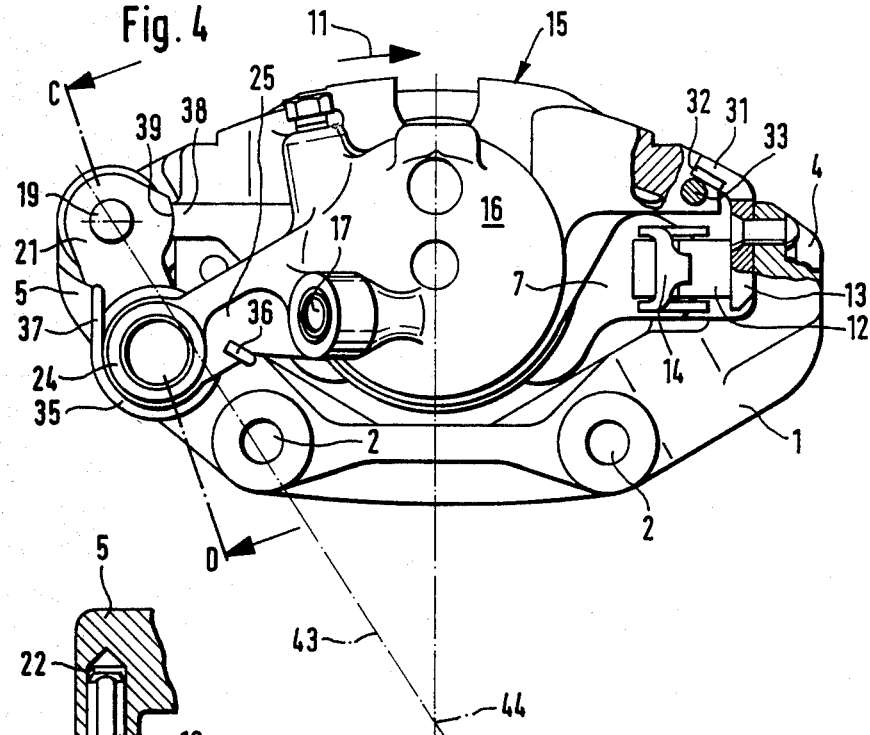
FIG. 4 is a partly sectional rear elevational view of the brake according to FIG. 1.

A mounting arrangement similar or identical to that described above may also be used for guiding the brake caliper 15 on the arm 4. However, in the construction depicted especially in FIG. 4, the supporting element 13 has a projection 31 which, as shown particularly in FIG. 4, extends radially outwardly of the brake disc 3 in a tangential direction of the latter and which has on its side close to the brake disc 3 a tangential sliding surface 32. A guiding pin 33 that extends parallel to the disc axis and is detachably coupled to the brake caliper 15 abuts the surface 32. This provides a sliding guide which allows the brake caliper 15 to perform limited movements in the direction 11 of rotation of the brake disc 3 and in the direction of the brake disc axis, while maintaining the brake caliper 15 approximately at a constant distance from the periphery of the brake disc 3. To keep the guide pin 33 in abutment with the projection 31 leaf springs 34 shown in FIG. 4 are fastened to the brake shoes 7 and 8 in the area of their radially outer surfaces. The springs 36 urge the brake caliper 15 radially outwardly. Simultaneously, the leaf springs 34 keep the brake shoes 7 and 8 in abutment with the projections 9 and 10, thus avoiding rattling noise.

To maintain the brake caliper 15 in a defined initial position in the direction 11 of rotation of the brake disc 3, a spring 35 is arranged on the supporting sleeve 24. The spring 35 has two legs 36 and 37. The spring leg 36 acts on the supporting arm 25 and the other spring leg 37 acts on the lever 21 in such a sense as to urge the lever 21 towards the supporting arm 25. Caused thereby, the brake caliper 15 is moved into a position in which a positioning cam 38 of the caliper 15 abuts an end face 39 of the lever 21.

The mode of operation of the spot-type disc brake construction described so far is as follows:

When the brake cylinder provided in the leg 16 of the brake caliper 15 is actuated, the brake shoe 7 will first move into abutment with the brake disc 3. Caused by the reaction force that becomes effective on the brake cylinder under these circumstances, the brake caliper 15 will be displaced in the direction of an arrow 40 until the brake shoe 8, too, bears against the brake disc 3. No appreciable movement of the brake caliper 15 in the direction 11 of rotation of the brake disc 3 takes place in this stage of actuation, since the effective friction forces are still too small to overcome the spring forces of the leaf springs 14 and the spring 35.

It shall be assumed for further consideration that the brake disc 3 rotates in the main direction 11 of rotation. When the actuating pressure continues to rise, the friction forces developing between the brake disc 3 and brake shoes 7 and 8 increase to such a level that the braking-force bell crank levers 12 are tilted and their lever arms abutting the end faces of the respective brake shoes 7 and 8 approach the supporting element 13, so that the brake shoes 7 and 8 are pressed against the brake disc 3 with increased forces by the lever arms of the braking-force bell crank levers 12 that abut on their rear sides. Corresponding to the movement of the braking-force bell crank levers 12, the brake shoes 7 and 8 are displaced in the direction 11 of rotation of the disc 3, while the brake caliper 15 will follow the movement of the brake shoes 7 and 8 as a result of the frictional contact between its legs 16 and 18 and the brake shoes 7 and 8. At the same time, the guide pin 33 slides along the sliding surface 32 in the direction towards the arm 4, and the lever 21 is swivelled counter clock wise as considered in FIG. 4, and the cam 38 becomes lifted off from the end face 39. Depending on the intensity of brake application and the elastic deformation of the components of the spot-type disc brake caused thereby, the movement of the brake caliper 15 in the main direction 11 of rotation of the brake disc 3 amounts to approximately 1–2 in millimeters.

When the brake is released, the brake caliper 15 will be moved by the spring 35 back to its initial position shown in the drawing. The leaf springs 14 will cause the braking-force bell crank levers 12 to resume their inactive positions, as a result of which also the brake shoes 7 and 8 will be again moved into their initial positions.

Upon rotation of the brake disc 3 in the direction of rotation opposite to that indicated by the arrow 11, the cams 38 of brake caliper 15 remain in abutment with the lever 21, so that no displacement is possible in this direction of rotation. However, in this direction of rotation the braking-force bell crank levers 12 are also ineffective and the braking forces that develop are comparatively low, so that there is no need for the brake caliper 15 to be additionally movable in this opposite direction of rotation of the brake disc 3.

With increasing wear of the brake shoes 7 and 8, the brake caliper 15 gradually moves relative to the brake support member 1 in the direction of the arrow 40. A dash-dot line 41 indicates the position the brake caliper 15 assumes when the brake shoes are completely worn out. The guide pin 19 will then have moved out of the bore 22 by a corresponding amount. The remaining length of engagement of the guide pin 19 with the surface bounding the bore 22 is, however, dimensioned such as to ensure satisfactory alignment of the brake caliper 15 relative to the brake disc 3.

Replacement of the brake shoes 7 and 8 is very easy with the spot-type disc brake construction described above. After detachment of the guide pin 33, the brake caliper 15 will be swung radially outwardly, as the guide pin 19 turns in the bore 22. A projection 42 at the side face of the caliper 15 adjacent to the arm 5 will come in abutment with the arm 5 after the caliper 15 has covered a tilting angle of about 90°, whereby the caliper 15 is held in this position. The brake shoes 7 and 8 will now be freely accessible and can be easily removed radially or axially and replaced by new brake shoes 7 and 8. Subsequently, the brake caliper 15 will be swung back over the brake shoes 7 and 8 and will be locked in its mounting position by means of the guide pin 33. The swinging movement of the brake caliper 15 during replacement of the brake shoes 7 and 8 will be assisted by the positioning cam 38 abutting the lever 21, since the latter participates in the swinging movement.

The location of the lever 21 is so chosen that, upon movement of the brake caliper 15 in the main direction 11 of rotation of the brake disc 3, the end of the brake caliper 15 situated at the side of entry of the disc 3 between the brake shoes 7 and 8 during forward movement of the vehicle moves approximately tangentially and, in doing so, slightly approaches the periphery of the brake disc 3. This counteracts the tendency of the ends of the brake shoes 7 and 8 disposed on the disc entry side to move radially outwardly. In this arrangement, the lever 21 will be positioned such that a plane interconnecting and defined by the axes of the two guide pins 19 and 20 forms an angle of about 15° with a radius 43 of the brake disc 3 that extends through the axis of the guide pin 19.

Figure 6:
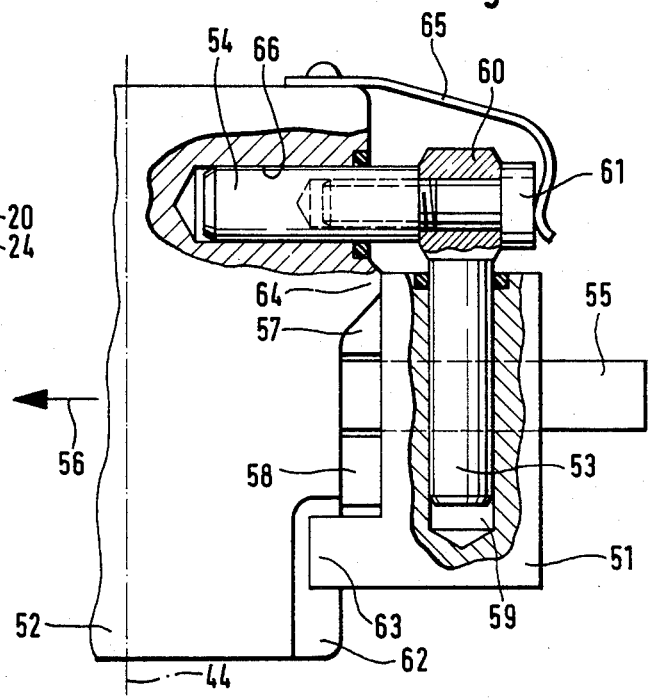
FIG. 6 is a view corresponding to that of FIG. 5 but of another spot-type disc brake with guide pins arranged at right angles to one another.

In a further modified construction of a spottype disc brake shown in FIG. 6, two guide pins 53 and 54 crossing each other serve to support a brake caliper 52 at a brake support member 51 for sliding in the direction of the axis of rotation of a brake disc 55 and in a main direction or rotation 56 of the brake disc 55. FIG. 6 shows only a part of the brake caliper guidance. The non-illustrated part of the brake is designed in the same manner as described hereinabove.

The brake caliper 52 serves to actuate brake shoes 57, 58 which are supported on the brake support member 51.

The guide pin 53 is slidably and rotatably supported in a bore 59 in the brake support member 51. At its end projecting out of the bore 59, the guide pin 53 carries a fastening sleeve 60. A screw 61 which is in threaded engagement with the guide pin 54, extends through the fastening sleeve 60 and rigidly interconnects the two guide pins 53 and 54. The guide pin 54 is aligned normal to the longitudinal axis of the guide pin 53 and engages a bore 66 in the brake caliper 52 for rotation and for longitudinal sliding. To prevent rotation of the brake caliper 52 about the guide pin 54, a projection 63 of the brake support member 51 overlaps the brake caliper 52 radially from the outside at a point axially remote from the guide pin 54. Springs that are clamped between the brake caliper 52 and the brake shoes 57 and 58 urge the brake caliper 52 radially outwardly and maintain a surface 62 of the caliper 52 in abutment with the projection 63.

To provide a defined inactive position for the brake caliper 52, a leaf spring 65 is secured to the brake caliper 52. This spring 65 bears against the screw 61 and urges a stop 64 of the brake caliper 52 against the brake support member 51. The mode of operation of the construction according to FIG. 6 corresponds substantially to that of the construction according to FIGS. 1 through 5. Displacement of the brake caliper 52 in the direction of an axis of rotation 44 of the brake disc 55 is accomplished by causing the guide pin 53 to retract out of the bore 59. The movement of the brake caliper 52 in the main direction of rotation 56 takes place by displacement of the bore 66 relative to the guide pin 54. The rigid connection between the two guide pins 53 and 54 provides for stable alignment of the brake caliper 52 relative to the brake disc 55 and thereby ensures an even wear of the two brake shoes 57 and 58. This construction renders it possible to replace the brake shoes 57 and 58 in the same advantageous manner as in the construction according to FIGS. 1 through 5. After detachment of the guide pin 33, the brake caliper 52 can be displaced in the main direction of rotation 56 until the surface 62 no longer abuts the projection 63. The brake caliper 52 may then be swung radially outwardly around the guide pin 53 and brake shoes 57, 58 can be removed from the brake support member 51 and replaced by new ones.

While the above mounting arrangements for the caliper are advantageous in many respects, the present invention also contemplates a different construction of the mounting arrangement, which has been omitted from the drawing in order not to unduly encumber the same. In this construction, there is provided a sliding block which is interposed between the caliper and the support member. Cooperating grooves and tongues projecting into the grooves are provided on the sliding block and/or on the caliper and support member, these grooves and tongues extending in such directions relative to one another as to permit the caliper to move relative to the support member in a direction parallel to the axis of the brake disc, as well as in the circumferential direction of the brake disc, while simultaneously preventing the caliper from turning relative to the support member about an axis extending in the radial direction of the brake disc.

While I have described above the principles of my invention in connection with specific apparatus it is to be clearly understood that this description is made only by way of example and not as a limitation to the scope of my invention as set forth in the objects thereof and in the accompanying claims.

I claim:

1. A spot-type disc brake for use in conjunction with a brake disc mounted on a support for rotation at least in one direction about an axis, comprising:
   a support member stationarily mounted on the support;
   first and second brake shoes respectively mounted on said support member at one and the other axial side of the brake disc for movement toward and away from the brake disc; and
   means for moving said brake shoes at least toward the brake disc, including a caliper member,
   means for mounting said caliper member on said support member for movement relative thereto so that said caliper member extends past the brake disc and said brake shoes, including a first guide element mounted on one of said members for movement relative thereto substantially parallel to the axis of the brake disc, and
   a second guide element mounted on the other of said members and rigidly connected to said first guide element so as to permit said caliper member to conduct movement relative to said support member substantially in and opposite to said one direction while preventing said caliper member from turning relative to said support member about an axis extending radially of the brake disc,
   an actuating unit mounted on said caliper member at said one axial side and acting on said first brake shoe directly and on said second brake shoe indirectly through said caliper member, wherein said members include respective guiding bores; and wherein said guide pins slidably received in the respective guiding bores, and
   wherein said guiding bores are centered on bore axes one of which is parallel to, and more remote from the axis of the brake disc than the other in the mounted condition of the disc brake; wherein said guide pins are coaxially received in said guiding bores for turning about said bore axes; and wherein said mounting means further includes a lever rigidly interconnecting said guide pins and keeping the same a predetermined distance apart.

2. The disc brake as defined in claim 1, wherein said guide pins extend in opposite axial directions from said lever.

3. The disc brake as defined in claim 2, wherein said lever has a portion constituting a stop; and further comprising spring means urging said caliper member opposite to said one direction toward abutment with said stop.

4. The disc brake as defined in claim 1; and further comprising at least one bell-crank-shaped brake-force-transmitting lever mounted on the exit end of the respective brake shoe as considered in said one direction and engaging said support member.

5. The disc brake as defined in claim 1, wherein a connecting plane defined by said bore axes extends generally radially of the brake disc in the mounted condition of the disc brake.

6. The disc brake as defined in claim 5, wherein said guiding bores with said one and said other bore axis are respectively provided in said support and said caliper member.

7. The disc brake as defined in claim 6, wherein said guiding bore with said other bore axis is situated at such a distance as considered in said one direction ahead of a radial plane defined by the axis of the brake disc and said one bore axis in the mounted condition of the disc brake that said connecting plane forms an angle of between substantially 10° and 20° with said radial plane.

8. A spot-type disc brake for use in conjunction with a brake disc mounted on a support for rotation at least in one direction about an axis, comprising:

a support member stationarily mounted on the support;

first and second brake shoes respectively mounted on said support member at one and the other axial side of the brake disc for movement toward and away from the brake disc; and means for moving said brake shoes at least toward the brake disc, including a caliper member, means for mounting said caliper member on said support member for movement relative thereto so that said caliper member extends past the brake disc and said brake shoes, including a first guide pin mounted on one of said members for movement relative thereto substantially parallel to the axis of the brake disc, and a second guide pin so mounted on the other of said members and rigidly connected to said first guide pin so as to permit said caliper member to conduct movement relative to said support member substantially in and opposite to said one direction while preventing said caliper member from turning relative to said support member about an axis extending radially of the brake disc, wherein said rigid connecting of guide pins includes a lever rigidly interconnecting said guide pins to space said guide pins at different diametral distances from said axis and keeping the pins a predetermined distance apart, and an actuating unit mounted on said caliper member at said one axial side and acting on said first brake shoe directly and on said second brake shoe indirectly through said caliper member.

9. A spot-type disc brake as claimed in claim 8, wherein said guide pins extend in opposite axial directions from said lever.

* * * * *